(12) United States Patent
Kumabe et al.

(10) Patent No.: US 10,628,048 B2
(45) Date of Patent: Apr. 21, 2020

(54) STORAGE CONTROL DEVICE FOR CONTROLLING WRITE ACCESS FROM HOST DEVICE TO MEMORY DEVICE

(71) Applicant: FUJITSU LIMITED, Kawasaki-shi, Kanagawa (JP)

(72) Inventors: Takuro Kumabe, Kawasaki (JP); Motohiro Sakai, Nerima (JP); Keima Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 15/819,063

(22) Filed: Nov. 21, 2017

(65) Prior Publication Data

US 2018/0181318 A1 Jun. 28, 2018

(30) Foreign Application Priority Data

Dec. 28, 2016 (JP) ................................ 2016-254801

(51) Int. Cl.
| | |
|---|---|
| *G06F 12/00* | (2006.01) |
| *G06F 3/06* | (2006.01) |
| *G06F 12/0875* | (2016.01) |
| *G06F 13/00* | (2006.01) |
| *G06F 13/28* | (2006.01) |

(52) U.S. Cl.
CPC .......... *G06F 3/0611* (2013.01); *G06F 3/0634* (2013.01); *G06F 3/0655* (2013.01); *G06F 3/0688* (2013.01); *G06F 12/0875* (2013.01); *G06F 2212/452* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,463,759 | A | * | 10/1995 | Ghosh ................ | G06F 12/0804 711/105 |
| 5,561,783 | A | * | 10/1996 | Vanka ................ | G06F 12/0804 710/57 |
| 7,231,497 | B2 | * | 6/2007 | Trika ................ | G06F 12/0804 711/129 |

(Continued)

FOREIGN PATENT DOCUMENTS

| | | |
|---|---|---|
| JP | 2006-92120 | 4/2006 |
| JP | 2006-277205 | 10/2006 |

(Continued)

*Primary Examiner* — Mark A Giardino, Jr.
(74) *Attorney, Agent, or Firm* — Staas & Halsey LLP (57) ABSTRACT

A storage control device includes a processor configured to receive from a host device a write request for writing data into a memory device. The processor is configured to try to write the data into a cache memory. The processor is configured to select an operation mode of a write process for the write request from among a first mode and a second mode on the basis of whether a cache hit or a cache miss occurs at the trial. The processor is configured to return a response to the host device upon completion of writing the data into the cache memory without waiting for completion of the write process when the write process is performed in the first mode. The processor is configured to return a response to the host device upon completion of the write process when the write process is performed in the second mode.

12 Claims, 9 Drawing Sheets

(56) References Cited

U.S. PATENT DOCUMENTS

| | | | |
|---|---|---|---|
| 8,402,226 B1* | 3/2013 | Faibish | G06F 12/0804 |
| | | | 710/52 |
| 9,058,282 B2* | 6/2015 | Biswas | G06F 12/0884 |
| 2003/0028728 A1* | 2/2003 | Ito | G06F 12/0815 |
| | | | 711/118 |
| 2005/0195635 A1 | 9/2005 | Conley et al. | |
| 2006/0020752 A1* | 1/2006 | Schnapp | G06F 12/0804 |
| | | | 711/113 |
| 2006/0064550 A1 | 3/2006 | Katsuragi et al. | |
| 2006/0221393 A1 | 10/2006 | Takaki | |
| 2010/0274962 A1* | 10/2010 | Mosek | G06F 12/0804 |
| | | | 711/113 |
| 2012/0011326 A1 | 1/2012 | Higashijima et al. | |
| 2012/0221801 A1 | 8/2012 | Okawa | |
| 2015/0286438 A1* | 10/2015 | Simionescu | G06F 12/0866 |
| | | | 711/103 |

FOREIGN PATENT DOCUMENTS

| | | |
|---|---|---|
| JP | 2007-528079 | 10/2007 |
| JP | 2013-510360 | 3/2013 |
| JP | 2013-528843 | 7/2013 |

\* cited by examiner

| page addr |
|---|
| volume no |
| lba |
| nextCBE |
| previousCBE |
| writemode |

| nextWait |
|---|
| previousWait |
| volume no |
| lba |
| mode |
| writemode |

| PERFORMANCE MODEL | CACHE MODE | | REMARKS |
|---|---|---|---|
| | WriteBack MODE | WriteThrough MODE | |
| Cache Hit MODEL | - CAPABLE OF HIGH SPEED PROCESSING<br>- DEPENDENT ON DRAM PERFORMANCE | - SLOWER THAN WriteBack MODE<br>- DEPENDENT ON SSD PERFORMANCE | |
| Cache Miss MODEL SSD NECK | - DEPENDENT ON SSD PERFORMANCE | - DEPENDENT ON SSD PERFORMANCE | - EQUIVALENT PERFORMANCE, HOWEVER, CPU IS LIKELY TO BECOME BOTTLENECK IN SSD CASE |
| Cache Miss MODEL CPU NECK | - PERFORMANCE IS DETERIORATED SINCE CPU RESOURCES ARE DEVOTED TO OVERHEAD OF CACHE DUPLEXING | - DEPENDENT ON SSD PERFORMANCE | |

STORAGE CONTROL DEVICE FOR CONTROLLING WRITE ACCESS FROM HOST DEVICE TO MEMORY DEVICE

CROSS-REFERENCE TO RELATED APPLICATION

This application is based upon and claims the benefit of priority of the prior Japanese Patent Application No. 2016-254801, filed on Dec. 28, 2016, the entire contents of which are incorporated herein by reference.

FIELD

The embodiment discussed herein is related to a storage control device.

BACKGROUND

A storage device called all flash array (AFA) using a flash memory such as a solid state drive (SSD) as a memory device is known. The AFA may improve the access performance and the like by performing control considering the characteristics of the SSD, which is different from the characteristics of a hard disk drive (HDD).

In some cases, in the storage device, in order to fill a performance gap between the memory device and a control device which controls the access to the memory device, a cache memory using a dynamic random access memory (DRAM) or the like may be included in the control device. When the storage device includes a plurality of control devices, the cache memory may be included in each of the control devices.

As for operation modes using the cache memory, a WriteBack mode (hereinafter, sometimes referred to as a "WB mode") and a WriteThrough mode (hereinafter, sometimes referred to as a "WT mode") are known. The term "WriteBack" used herein may be referred to as "AfterWrite" or "WriteAfter".

The WB mode is an operation mode in which a control device writes data in the cache memory in response to a Write input/output (I/O) from a host device and returns a Write I/O response to the host device when the duplexing of cache data between control devices is completed. In the WB mode, since a situation occurs in which no data exists in the memory device and data exists in the cache memory, the cache data is duplexed between the control devices, thereby holding the redundancy of the cache data.

The WT mode is an operation mode in which the control device returns a response to the host device when the control device writes data in the memory device (e.g., SSD in AFA) via the cache memory in response to the Write I/O. In the WT mode, since data is written in the memory device as a continuation of a process related to the I/O, there is no need to hold the redundancy of the cache data, thereby eliminating a need for a duplexing process between control devices.

In the WT mode, since a disk access is performed before the status related to the I/O is responded to the host device, the response time tends to degrade as compared with a case in the WB mode. For this reason, in some cases, for example, the storage device basically operates in the WB mode and may switch the operation mode from the WB mode to the WT mode for operation when a power supply such as a battery is abnormal.

Related technologies are disclosed in, for example, Japanese National Publication of International Patent Application No. 2013-510360, Japanese Laid-Open Patent Publication No. 2006-277205, Japanese National Publication of International Patent Application No. 2013-528843, Japanese Laid-Open Patent Publication No. 2006-092120, and Japanese National Publication of International Patent Application No. 2007-528079.

SUMMARY

According to an aspect of the present invention, provided is a storage control device including a memory and a processor coupled to the memory. The processor is configured to receive from a host device a write request for writing data into a memory device. The processor is configured to try to write the data into a cache memory. The processor is configured to select an operation mode of a write process for the write request from among a first mode and a second mode on the basis of whether a cache hit or a cache miss occurs at the trial. The write process is a process of writing the data into the memory device via the cache memory. The processor is configured to return a response to the host device upon completion of writing the data into the cache memory without waiting for completion of the write process when the write process is performed in the first mode. The processor is configured to return a response to the host device upon completion of the write process when the write process is performed in the second mode.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

In the WriteBack (WB) mode, a processor of the control device, such as a central processing unit (CPU) for example, performs a process of duplexing the cache data. In a storage device such as an AFA, since the write performance in a destage process of writing data stored in the cache memory into the memory device is higher than writing into an HDD, the processing performance of the processor may become a bottleneck depending on the processing load of the processor.

For example, when a cache miss occurs with respect to a Write I/O, the Write I/O is caused to wait for cache acquisition. When the processing load of the processor is high, in the WB mode, processor resources are further devoted as much as the overhead of the duplexing process. In this manner, as the processing load of the processor increases, the performance of the storage device, on which a high-performance memory device is mounted, is not fully delivered.

Hereinafter, an embodiment of the present disclosure will be described with reference to the accompanying drawings. The following embodiment is merely illustrative and is not intended to exclude various modifications and technical applications which are not explicitly described in the specification. For example, the disclosed embodiment may be implemented with various modifications without departing from the spirit and scope of the present disclosure. Throughout the specification and the drawings, like elements and portions are denoted by like reference numerals unless otherwise specified.

Embodiment

Figure 1:
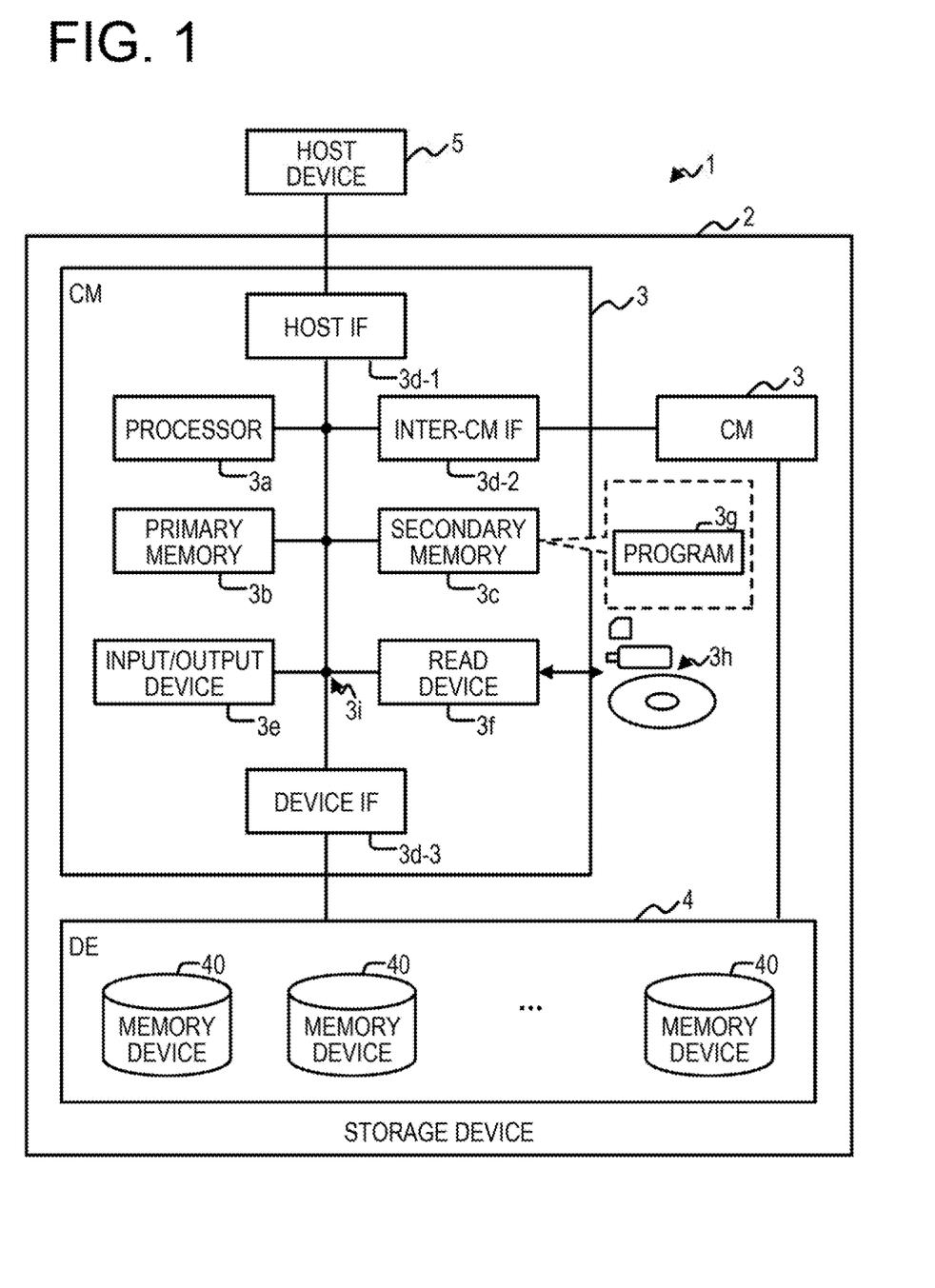
FIG. 1 is a diagram illustrating an exemplary configuration of a storage system according to an embodiment.

As illustrated in FIG. 1, a storage system 1 according to an embodiment may include a storage device 2 and a host device 5. It is to be noted that the storage system 1 may include a plurality of storage devices 2 to constitute a scale-out type storage system. A plurality of host devices 5 may be coupled to the storage device 2.

The host device 5 is an example of an upper-level device that performs I/O such as Read/Write to the storage device 2. As used herein, the term "I/O" refers to an access request including at least address information (e.g., a logical address) of an access destination and data to be written (in the case of a Write access). As an example, the host device 5 may issue an I/O designating one or more logical addresses (e.g., logical block address (LBA)) of a size such as 512 B or 4 KB.

Examples of the host device 5 may include a computer such as a server, a personal computer (PC), a tablet, a personal digital assistant (PDA), and the like. The host device 5 may be coupled to the storage device 2 via a network (not illustrated) including, for example, a storage area network (SAN), an intranet such as a local area network (LAN) or a wide area network (WAN), the Internet, or the like.

The storage device 2 is a device that provides a memory area for the host device 5. An AFA may be one non-limiting example of the storage device 2. The storage device 2 may include one or more (two in FIG. 1) controller modules (CMs) 3 and one or more (one in FIG. 1) drive enclosures (DEs) 4.

Each CM 3 is an example of a storage control device or an information processing apparatus (computer) that controls accesses from the host device 5 to a plurality of memory devices 40.

As illustrated in FIG. 1, each CM 3 may be configured to be redundant (e.g., duplexed) with other CMs 3. When the storage device 2 includes a plurality of CMs 3, these CMs 3 may be housed in a housing such as a controller enclosure (CE).

The DE 4 may include a plurality of memory devices 40 and perform various accesses such as writing or reading of data to the memory devices 40 in response to a request from the CM 3. In the DE 4, one or more storage groups may be constructed using these memory devices 40 under the control of the CM 3. An example of a storage group is a redundant array of inexpensive disks (RAID) group. Although it is illustrated in FIG. 1 that one DE 4 is included in the storage device 2, the storage device 2 may include a plurality of cascade-connected DEs 4.

The memory device 40 is an example of hardware that stores therein various data, programs, and the like. Examples of the memory device 40 may include various memory devices such as a semiconductor drive device (which may be referred to as a "flash memory"), for example, an SSD. Also, a memory device other than an SSD, for example, a magnetic disk device such as an HDD may be used as the memory device 40. Although the storage device 2 may be an AFA as described above, a high performance HDD (e.g., a high-speed HDD with around 15,000 revolutions per minute (rpm) or more) may be adopted under predetermined conditions such as in an operation involving many sequential accesses, which take advantage of the performance of HDD. Hereinafter, the memory device 40 may be sometimes referred to as a "memory device" or simply a "device".

Next, an exemplary hardware configuration of the CM 3 will be described with reference to FIG. 1. As illustrated in FIG. 1, the CM 3 may include a processor 3a, a primary memory 3b, a secondary memory 3c, a host interface (IF) 3d-1, an inter-CM IF 3d-2, a device IF 3d-3, an input/output device 3e, and a read device 3f.

The processor 3a is an example of an arithmetic processing unit that performs various controls and arithmetic operations. The processor 3a may be communicably coupled to each of the components 3b to 3f via a bus 3i. The processor 3a may be an integrated circuit (IC) such as a CPU, a micro processing unit (MPU), a digital signal processor (DSP), an application specific integrated circuit (ASIC), or a programmable logic device (PLD) (e.g., a field programmable gate array (FPGA)).

The primary memory 3b is an example of hardware that stores therein various data and programs. An example of the primary memory 3b may include a volatile memory such as a random access memory (RAM).

The secondary memory 3c is an example of hardware that stores therein various data, programs, and the like. For example, the secondary memory 3c may be used as a secondary memory device of the CM 3 and may store therein a firmware program and various data. Examples of the secondary memory 3c may include a magnetic disk device such as an HDD, a semiconductor drive device such as an SSD, and various memory devices such as a nonvolatile memory. Examples of the nonvolatile memory may include a storage class memory (SCM), a read-only memory (ROM), and the like. The secondary memory 3c may store therein a program 3g that implements all or part of various functions of the CM 3.

The host IF 3d-1, the inter-CM IF 3d-2, and the device IF 3d-3 are examples of communication interfaces that control connection and communication with the host device 5, other CMs 3, and other devices (e.g., the memory device 40 in the DE 4), respectively. The CM 3 may include a communication interface that controls connection and communication with an operator's terminal, and may download the program 3g from a network (not illustrated) using the communication interface.

The input/output device 3e may include at least one of an input device such as a mouse, a keyboard, a touch panel, an operation button, and the like or an output device such as a display, a printer, and the like.

The read device 3f is an example of a reader that reads data and programs recorded on a recording medium 3h to output the read data and programs to the processor 3a. The read device 3f may be a connection terminal or device capable of connecting or inserting the recording medium 3h. Examples of the read device 3f may include an adapter conforming to a universal serial bus (USB) or the like, a drive which accesses a recording disk, a card reader which accesses a flash memory such as a Secure Digital card (SD card), and the like. The program 3g may be stored in the recording medium 3h.

Examples of the recording medium 3h may include a non-transitory computer-readable recording medium such as a magnetic/optical disk, a flash memory, or the like. Examples of the magnetic/optical disk may include a flexible disk, a compact disc (CD), a digital versatile disc (DVD), a Blu-ray disc, a holographic versatile disc (HVD), or the like. Examples of the flash memory may include a semiconductor memory such as a USB memory, an SD card, or the like. Examples of the CD may include a CD-ROM, a CD-R, a CD-RW, or the like. Examples of the DVD may include a DVD-ROM, a DVD-RAM, a DVD-R, a DVD-RW, a DVD+R, a DVD+RW, or the like.

The above-described hardware configuration of the CM 3 is only illustrative. Therefore, increase/decrease of hardware (e.g., addition/deletion of an arbitrary component), division of hardware, integration of hardware by arbitrary combination, addition or omission of a bus, etc. in the CM 3 may be made as appropriate.

Figure 2:
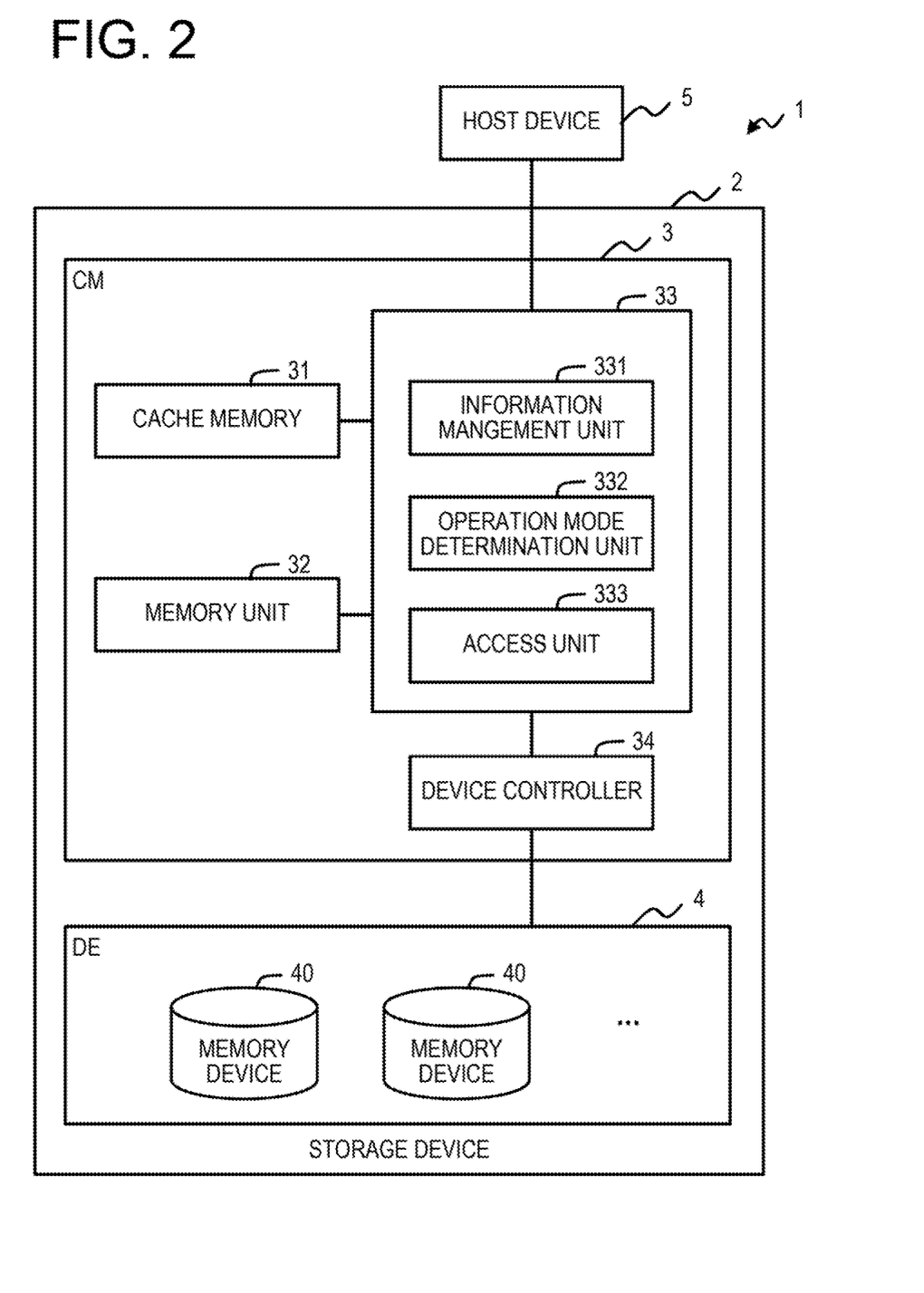
FIG. 2 is a diagram illustrating an exemplary functional configuration of a storage device.

FIG. 2 is a diagram illustrating an exemplary functional configuration of the CM 3. As illustrated in FIG. 2, the CM 3 may include a cache memory 31, a memory unit 32, a cache controller 33, and a device controller 34. The functions of the cache controller 33 and the device controller 34 may be implemented, for example, by causing the processor 3a illustrated in FIG. 1 to load the program 3g stored in the secondary memory 3c onto the primary memory 3b to execute the loaded program 3g.

The cache memory 31 stores therein data transferred between the processor 3a (see FIG. 1) and the memory device 40. The memory unit 32 may store therein various information related to the processing performed by the CM 3. The cache memory 31 and the memory unit 32 may be implemented by non-overlapping memory areas of the primary memory 3b illustrated in FIG. 1.

The information stored in the memory unit 32 will be described below with reference to FIGS. 3 to 6. In the description with reference to FIGS. 3 to 6, various types of information (e.g., information 321 to 324) stored in the memory unit 32 are exemplified in the form of links or tables suitable for explanation. However, these types of information are not limited to the form of links or tables but may be managed in other various forms or manners such as a matrix, a database (DB), a bitmap, and the like.

Figure 3:
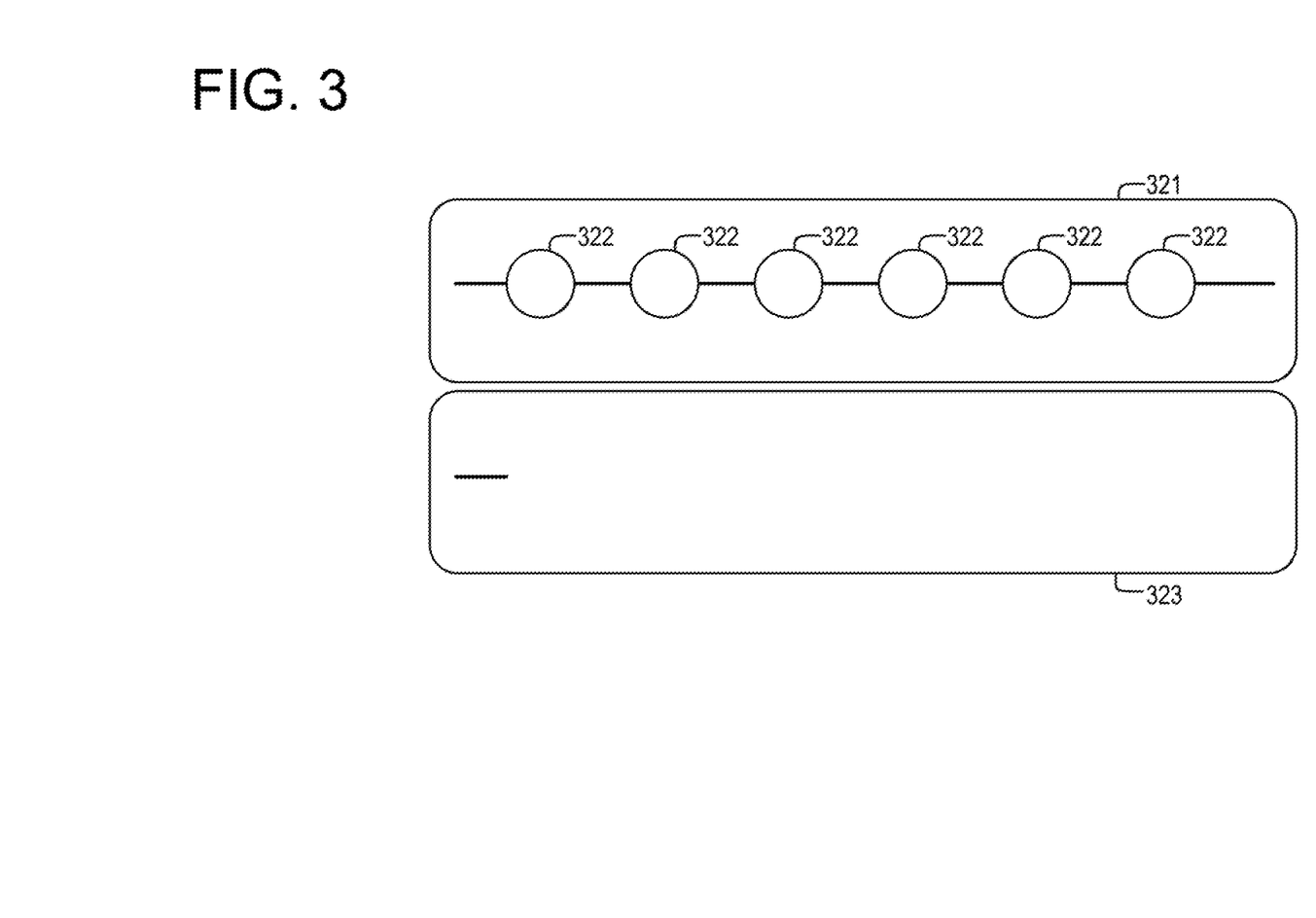
FIG. 3 is a diagram illustrating an example of free-cache-page management information and a cache acquisition queue.

As illustrated in FIG. 3, free-cache-page management information 321 is an example of information for managing cache resources of the cache memory 31 on a cache page basis. The cache page may be managed, for example, in units of 65 KB (kilobyte). In this example, data to be cached is stored in 64 KB out of the 65 KB, and additional information such as a check code of the data may be stored in the residual 1 KB.

In the free-cache-page management information 321, pieces of cache control information 322 corresponding to a free (unused) cache page may be linked with each other to be managed. As illustrated in FIG. 3, when there is a free (unused) cache page, in other words, when there is no piece of waiting requisition for cache acquisition, one or more linked pieces of cache control information 322 are held in the free-cache-page management information 321.

The cache control information 322 is information used for cache control and may be, for example, an information element called a cache bundled element (CBE) associated with each of a plurality of cache pages in the cache memory 31. Hereinafter, it is assumed that the cache control information 322 is a CBE. The cache control information 322 may be generated for each cache page of the cache memory 31 at a predetermined timing such as when the CM 3 is activated or the like.

Figure 5:
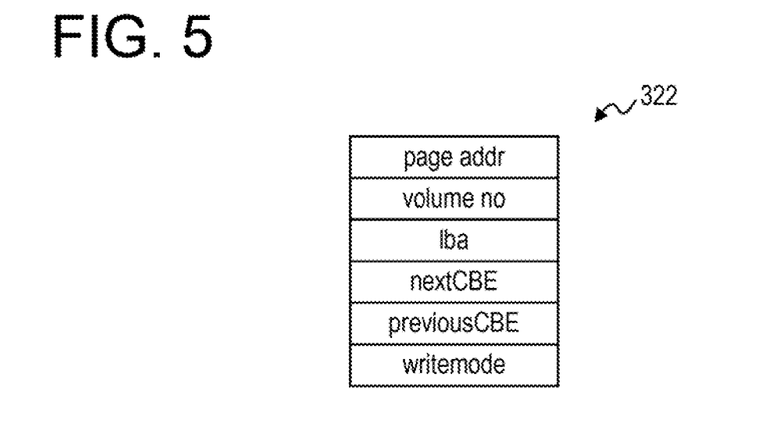
FIG. 5 is a diagram illustrating an example of cache control information.

As illustrated in FIG. 5, the cache control information 322 may include information of "page addr", "volume no", "lba", "nextCBE", "previousCBE", and "writemode". The "page addr" is information indicating an address of a cache page with which the cache control information 322 is associated (allocated). The "volume no" may be set with a volume number of a volume (e.g., a logical volume) requested to be accessed by an I/O from the host device 5. The "lba" may be set with information of a logical address (e.g., LBA) of the volume requested to be accessed by the I/O from the host device 5. The "volume no" and "lba" may be set in a case where data is written in a cache page corresponding to the cache control information 322.

The "nextCBE" and "previousCBE" are members for constructing various links in the free-cache-page management information 321. The "nextCBE" may store a succeeding CBE and the "previousCBE" may store a preceding CBE. The phrase "storing a preceding/succeeding CBE" may mean storing information for identifying the CBE, for example, information such as a pointer or an identifier (ID) indicating an entry of the CBE. The "writemode" may be set with one of the WB mode and the WT mode, thereby indicating whether a cache page corresponding to the cache control information 322 is operating in the WB mode or the WT mode.

Figure 4:
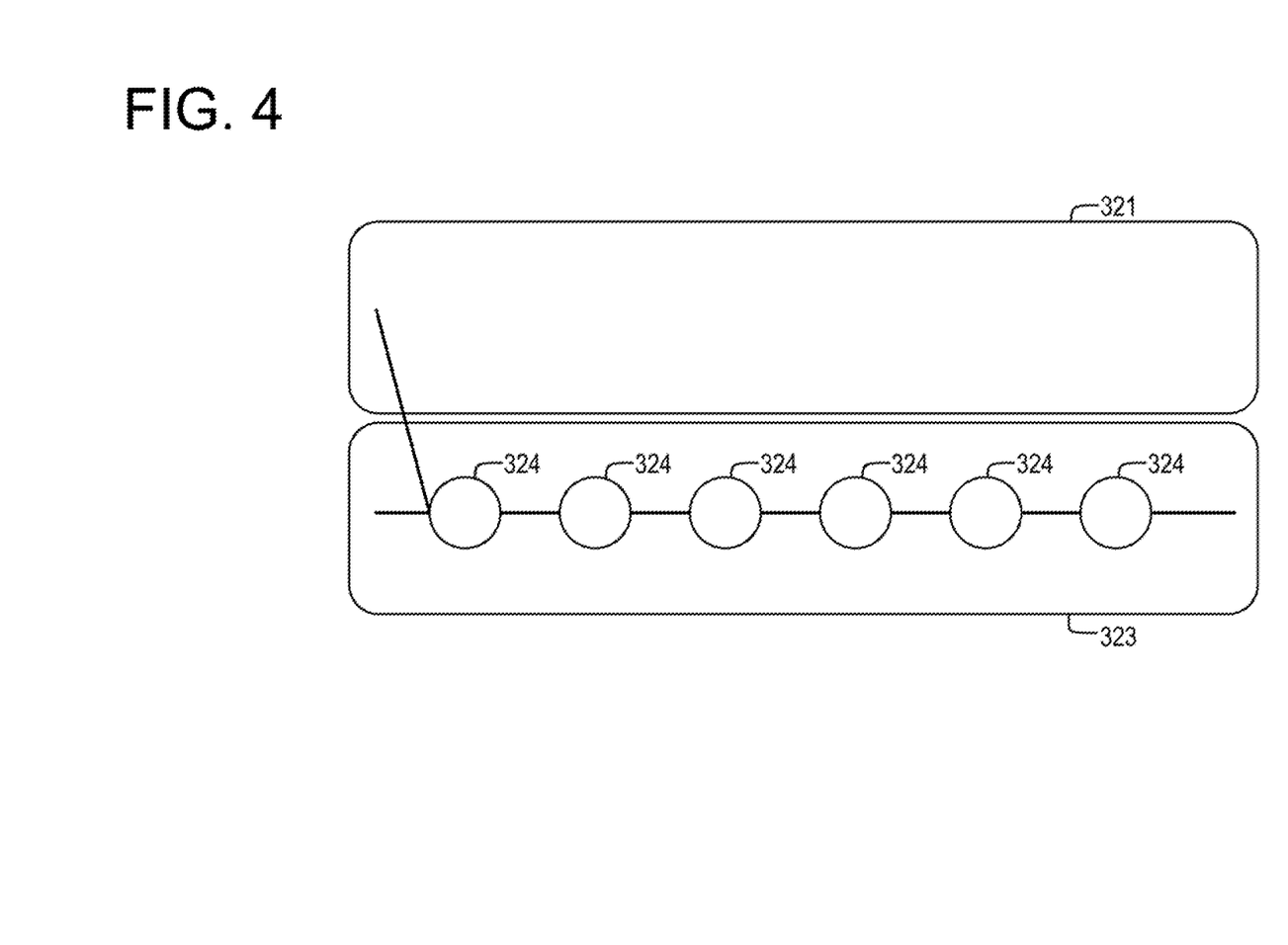
FIG. 4 is a diagram illustrating an example of free-cache-page management information and a cache acquisition queue.

As illustrated in FIG. 4, when there is no unused cache page, in other words, when there are some pieces of waiting requisition for cache acquisition, there is no piece of cache control information 322 in the free-cache-page management information 321.

Although it has been described above that cache control information 322 corresponding to a free cache page is set in the free-cache-page management information 321, cache control information 322 already allocated to a logical address may also be stored in the memory unit 32. For example, cache control information 322 already allocated to a logical address may be used as a control link (not illustrated) in a cache replacement algorithm such as a least recently used (LRU). For example, as a link in the LRU, the "nextCBE" and "previousCBE" may be dynamically rewritten in response to an access to a cache page so that corresponding piece of cache control information 322 is in a position (order) that is difficult to be destaged.

As illustrated in FIG. 4, a cache acquisition queue 323 is a queue for a Write I/O postponed until a free cache page is available when cache pages for Write are exhausted. In other words, the cache acquisition queue 323 is an example of information for managing an I/O waiting for acquisition of cache resources of the cache memory 31. Hereinafter, the cache acquisition queue 323 may be simply referred to as a "queue 323".

In the queue 323, pieces of I/O control information 324 corresponding to an I/O waiting for cache acquisition may be linked with each other to be managed. As illustrated in FIG. 4, when there is no free (unused) cache page, in other words, when there are some pieces of waiting requisition for cache acquisition, one or more linked pieces of I/O control information 324 are held in the queue 323.

The I/O control information 324 is information used for I/O control and may be set, for example, with a variety of information related to an I/O. The I/O control information 324 may be acquired (e.g., an entry is generated) when the CM 3 receives an I/O, and may be released (e.g., the entry is deleted) when processing for the I/O is completed.

Figure 6:
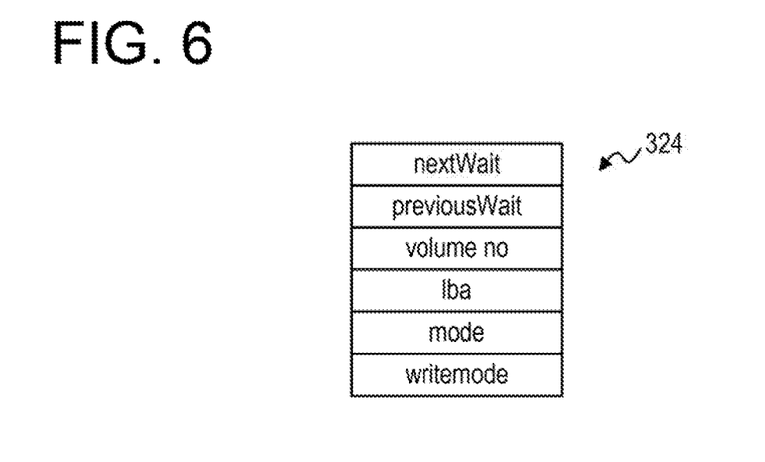
FIG. 6 is a diagram illustrating an example of I/O control information.

As illustrated in FIG. 6, the I/O control information 324 may include information of "nextWait", "previousWait", "volume no", "lba", "mode", and "writemode". The "nextWait" and "previousWait" are members for constructing various links in the queue 323. The "nextWait" may store succeeding I/O control information 324 and the "previousWait" may store preceding I/O control information 324. The phrase "storing preceding/succeeding I/O control information 324" may mean storing information for identifying the I/O control information 324, for example, information such as a pointer or an ID indicating an entry of the I/O control information 324.

The "volume no" may be set with a volume number of a volume (e.g., a logical volume) requested to be accessed by an I/O from the host device 5. The "lba" may be set with information of an LBA of the volume requested to be accessed by the I/O from the host device 5. The "mode" may be set with information of a command requested by the I/O from the host device 5. The "writemode" may be set with one of the WB mode and the WT mode.

As illustrated in FIG. 3, when there is a piece of cache control information 322 corresponding to an unused cache page, in other words, when there is no piece of waiting requisition for cache acquisition, there is no piece of I/O control information 324 in the queue 323.

As described above, as illustrated in FIG. 3, when there is a piece of cache control information 322 in the free-cache-page management information 321 or when there is no piece of I/O control information 324 in the queue 323, the CM 3 may determine that there is no piece of waiting requisition for cache acquisition.

In addition, as illustrated in FIG. 4, when there is no piece of cache control information 322 in the free-cache-page management information 321 or when there is a piece of I/O control information 324 in the queue 323, the CM 3 may determine that there are some pieces of waiting requisition for cache acquisition. At this time, the CM 3 may determine that the number of pieces of I/O control information 324 existing (linked) in the queue 323 indicates the number of I/Os waiting for cache acquisition.

Returning to FIG. 2, the cache controller 33 performs various controls on the cache memory 31 with respect to I/Os from the host device 5.

For example, the cache controller 33 may control reception of an I/O, determination on cache hit/miss, an access to the cache memory 31, update of information stored in the memory unit 32, determination on an operation mode (hereinafter, sometimes referred to as a "cache mode"), and the like. In addition, the cache controller 33 may control a destage process of writing cache data stored in the cache memory 31 into the memory device 40 in cooperation with the device controller 34.

The "destage process" may be referred to as "destage" or "destaging". The reception of an I/O, the determination on cache hit/miss, and the destage process may be performed by various known methods and detailed description thereof will be omitted for the purpose of brevity.

The cache controller 33 may include an information management unit 331, an operation mode determination unit 332, and an access unit 333.

The information management unit 331 updates the free-cache-page management information 321 and the queue 323 described with reference to FIGS. 3 to 6, in response to reception of an I/O, an access to the cache memory 31, determination on the operation mode, the cache data destage process, and the like.

The operation mode determination unit 332 determines, for each I/O, an operation mode of writing data into the cache memory 31 on the basis of the situation of cache hit/miss of the data to be written by a Write I/O.

The access unit 333 performs the write process for the Write I/O in the operation mode determined by the operation mode determination unit 332.

The relationship between a performance model and a cache mode of the storage device 2 will be described with reference to FIG. 7. The term "performance model" used herein means an index representing a tendency of cache hit/miss of the storage device 2 at a certain timing. Among the performance models, a "Cache Hit model" indicates that the storage device 2 is inclined to make a cache hit. A "Cache Miss model SSD neck" indicates that the storage device 2 is inclined to make a cache miss and the SSD is the bottleneck. A "Cache Miss model CPU neck" indicates that the storage device 2 is inclined to make a cache miss and the CPU 3a is the bottleneck.

Figure 7:
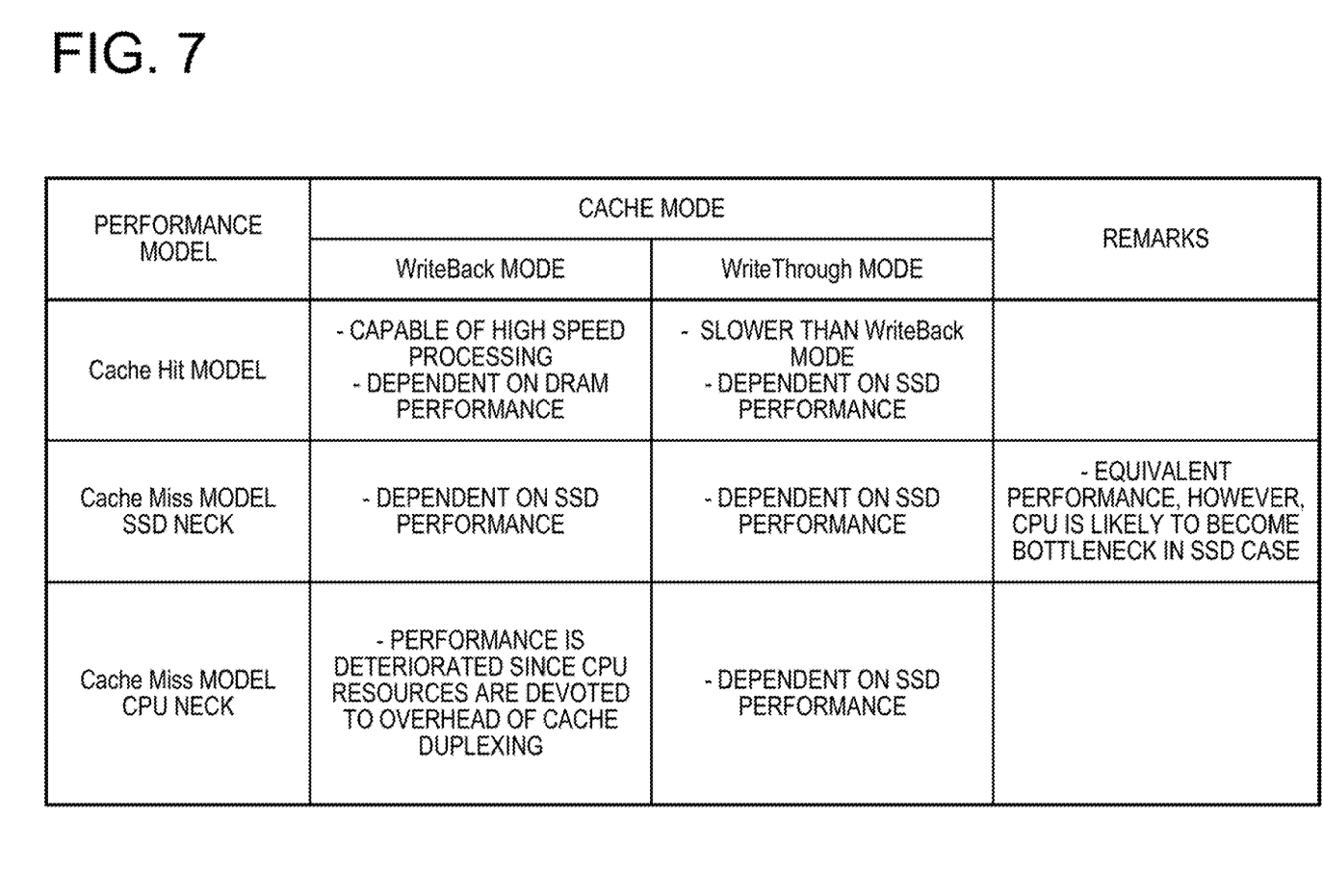
FIG. 7 is a diagram illustrating an exemplary relationship between a performance model and a cache mode of a storage device in terms of performance.

As illustrated in FIG. 7, in the Cache Hit model, the WB mode allows faster processing than the WT mode.

In the Cache Miss model SSD neck, the WB mode and the WT mode have comparable performance. In this case, since the processing load of the CPU 3a increases with the cache miss, the performance model tends to shift to the CPU neck.

In the Cache Miss model CPU neck, since a cache duplexing process becomes slower than usual, the performance of the storage device 2 is not fully delivered in some cases. In particular, according to the method used in the related art, since the cache mode basically adopted is the WB mode irrespective of the performance model, the storage device 2 like the AFA which employs an SSD faster than an HDD may fail to obtain maximum performance thereof.

From the above, when considering the maximum performance of the storage device 2, there is a case where the maximum performance may be derived by using the WT mode rather than the WB mode in which the cache memory 31 is duplexed, because there is no wasteful processing in the WT mode.

Therefore, the operation mode determination unit 332 according to the embodiment dynamically switches the cache mode depending on the performance model, thereby improving the maximum performance of the storage device 2.

For example, the operation mode determination unit 332 may determine the operation mode on the basis of the following determination conditions.

(a) In a Case of a Cache Hit

In a case of a cache hit, the operation mode determination unit 332 may select an operation mode already set in the cache control information 322 corresponding to the hit cache page.

Figure 8:
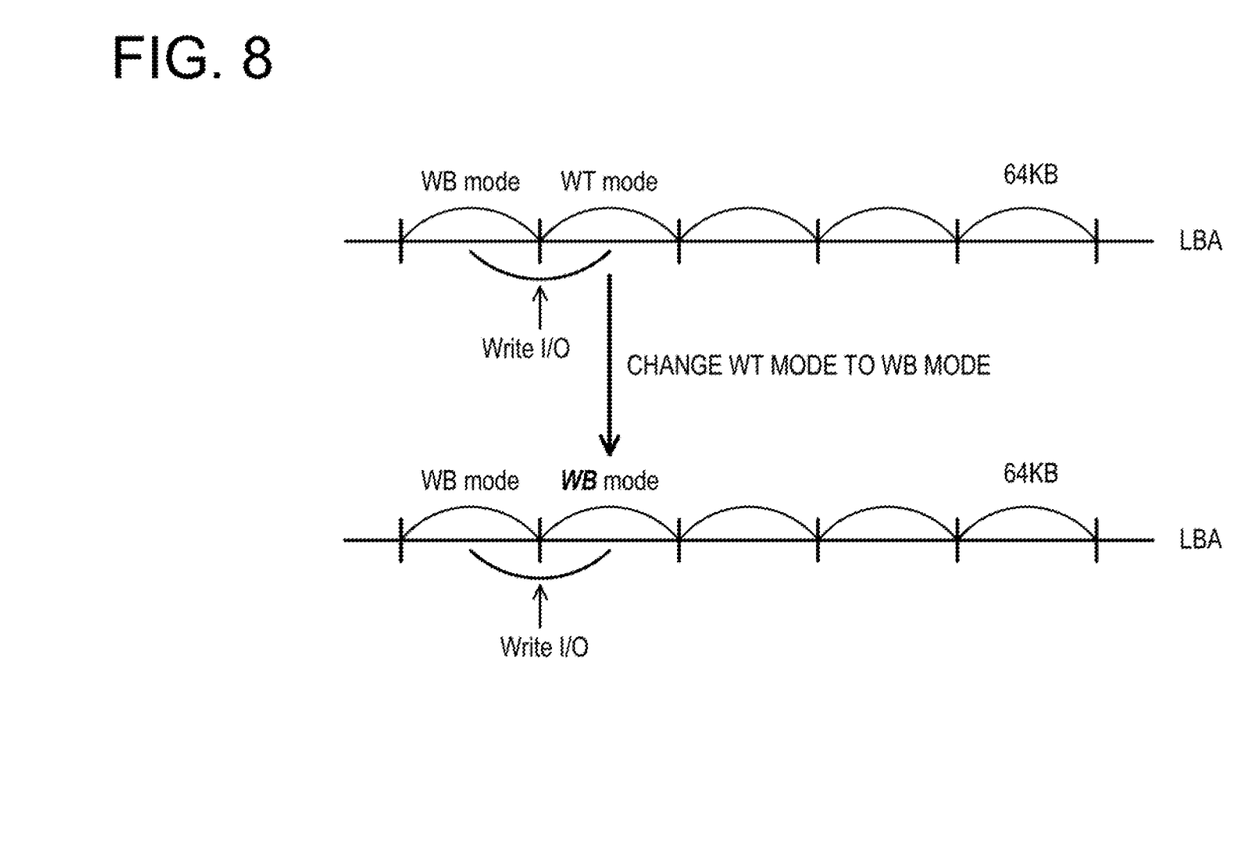
FIG. 8 is a diagram illustrating an exemplary process of an operation mode determination unit in a case where an access range of a Write I/O spans a plurality of cache pages.

The range (access range) of the logical addresses designated in the Write I/O may span over the boundary of cache pages. As illustrated in FIG. 8, when the access range of the Write I/O spans a plurality of cache pages and there is a cache page operated in the WB mode, the operation mode determination unit 332 may select the WB mode for all the cache pages. Determination on the operation mode of the cache page may be made, for example, by referring to the "writemode" of the cache control information 322.

As a result, it is possible to avoid a situation where, among pieces of data related to one Write I/O, some exist in the memory device 40 and the cache memory 31 (WT mode) while the others exist in the cache memory 31 (WB mode). Alternatively, the entire cache pages related to the Write I/O may be switched to the WT mode after destaging cache pages of the WB mode to ensure consistency of the data between the cache pages and the corresponding areas of the memory device 40.

(b) In a Case of a Cache Miss

In a case of a cache miss, the cache controller 33 attempts to acquire a new cache page for the Write I/O. At this time, the operation mode determination unit 332 may refer to the free-cache-page management information 321 or the queue 323 to determine the operation mode as follows depending on a situation of waiting requisition for cache acquisition.

(b-1) When there is No Piece of Waiting Requisition for Cache Acquisition

The operation mode determination unit 332 selects the WT mode for the operation mode. When there are cache pages of the WB mode in the cache pages acquired for the Write I/O, the operation mode determination unit 332 may select the WB mode. Alternatively, the cache pages of the WB mode may be destaged and then switched to the WT mode. As described with reference to FIG. 8, the same applies to a case where the access range of the Write I/O spans a plurality of cache pages.

(b-2) When there are Some Pieces of Waiting Requisition for Cache Acquisition

The operation mode determination unit 332 may count the number of pieces of I/O control information 324 linked to the queue 323 by referring to the queue 323 to acquire the number of I/Os waiting for cache acquisition. Then, the operation mode determination unit 332 may determine the operation mode as follows depending on the number of I/Os waiting for cache acquisition.

(b-2-1) In a Case where the Number of I/Os Waiting for Cache Acquisition is Smaller than a Predefined Number This case indicates that there is a certain margin in the processing capacity of the memory device 40 such as an SSD. In other words, the memory device 40 may fail to utilize the processing performance thereof since the processor 3a becomes a bottleneck. In this case, the operation mode determination unit 332 may select the WT mode for the operation mode.

(b-2-2) In a Case where the Number of I/Os Waiting for Cache Acquisition is Equal to or Larger than the Predefined Number This case indicates that the destage of cache data into the memory device 40 such as an SSD is in arrears. In other words, the memory device 40 becomes a bottleneck and the processor 3a has a certain margin in the processing capacity. In this case, the operation mode determination unit 332 may select the WB mode for the operation mode.

In the case of (b-2-1) or (b-2-2), since there are some pieces of waiting requisition for cache acquisition, the information management unit 331 may set the cache mode selected by the operation mode determination unit 332 for the I/O control information 324 secured in response to the reception of the I/O. Then, the information management unit 331 may register the I/O control information 324 in the queue 323.

When the I/O control information 324 is registered in the queue 323, the cache controller 33 may cooperate with the device controller 34 to perform a process of destaging the cache data into the memory device 40. When a free area occurs in the cache memory 31 due to the destage process and the I/O control information 324 is dequeued from the queue 323, the access unit 333 may refer to the cache mode set in the I/O control information 324.

In this manner, when a write I/O is registered in the queue 323, information indicating the operation mode of the I/O is set in the I/O control information 324 and the I/O control information 324 is registered in the queue 323. As a result, the access unit 333 may perform the write process either in the WB mode or in the WT mode for each I/O.

Returning to FIG. 2, the device controller 34 cooperates with the cache controller 33 to control an access, for example, to the memory device 40 in the DE 4. As an example, the device controller 34 may control the destage process of writing data stored in the cache memory 31 into the memory device 40 and the stage process of reading data from the memory device 40 into the cache memory 31. The "stage process" may be referred to as "stage" or "staging".

As described above, the information management unit 331 is an example of a registration unit that registers control information regarding a write request in the queue 323. The information management unit 331 as the registration unit may set information indicating the determined operation mode in the control information in a case where a cache miss occurs with respect to the write request and the write request is caused to wait for cache acquisition.

The operation mode determination unit 332 is an example of a determination unit that determines the operation mode of the write process for the write request from among the WB mode and the WT mode, based on the situation of cache hit/miss in the cache memory 31 with respect to a write address designated in the write request.

The access unit 333 is an example of a write unit that performs a write process for the write request in the determined operation mode via the cache memory 31.

The cache controller 33 and the device controller 34 are examples of a destage unit that performs the destage of data from the cache memory 31 into the memory device 40 in a case where a cache miss occurs with respect to the write request and the write request is caused to wait for cache acquisition. The cache controller 33 and the device controller 34 as the destage unit may extract the control information from the queue 323. Further, the access unit 333 as the write unit may perform the write process for the write request indicated by the control information, in the operation mode set in the extracted control information.

The CM 3 according to the embodiment may dynamically determine the cache mode from among the WB mode and the WT mode for each I/O rather than for each CM 3 or for the entire storage device 2, depending on the situation of cache hit/miss. Therefore, the operation mode may be switched to the WT mode in units of I/O so as to reduce the processing load of the CPU 3a and to take advantage of the performance of the memory device 40 such as an SSD, thereby improving the performance of the storage device 2.

Figure 9:
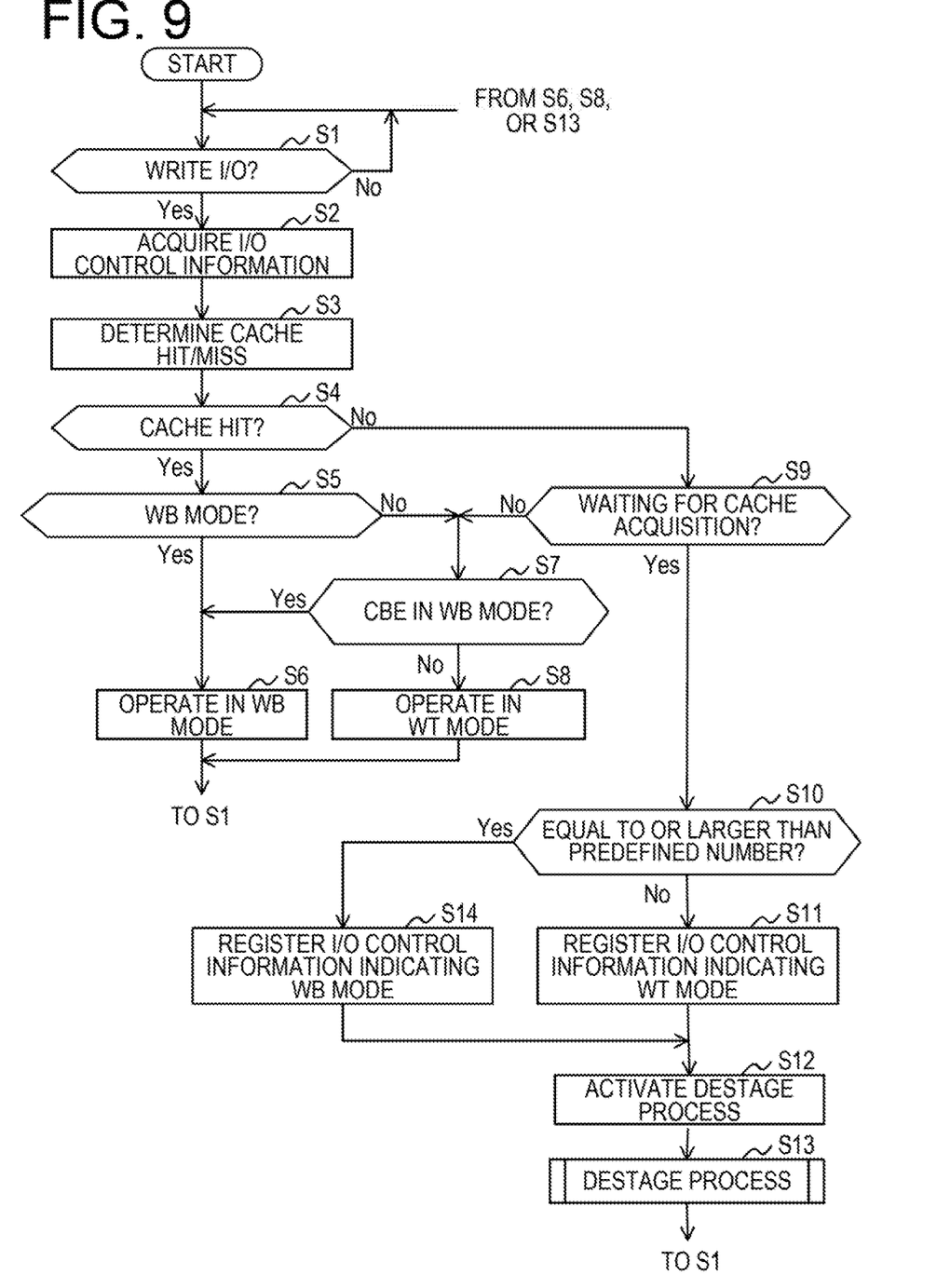
FIG. 9 is a flowchart illustrating an exemplary operation of a Write I/O reception process performed by a CM.
Figure 10:
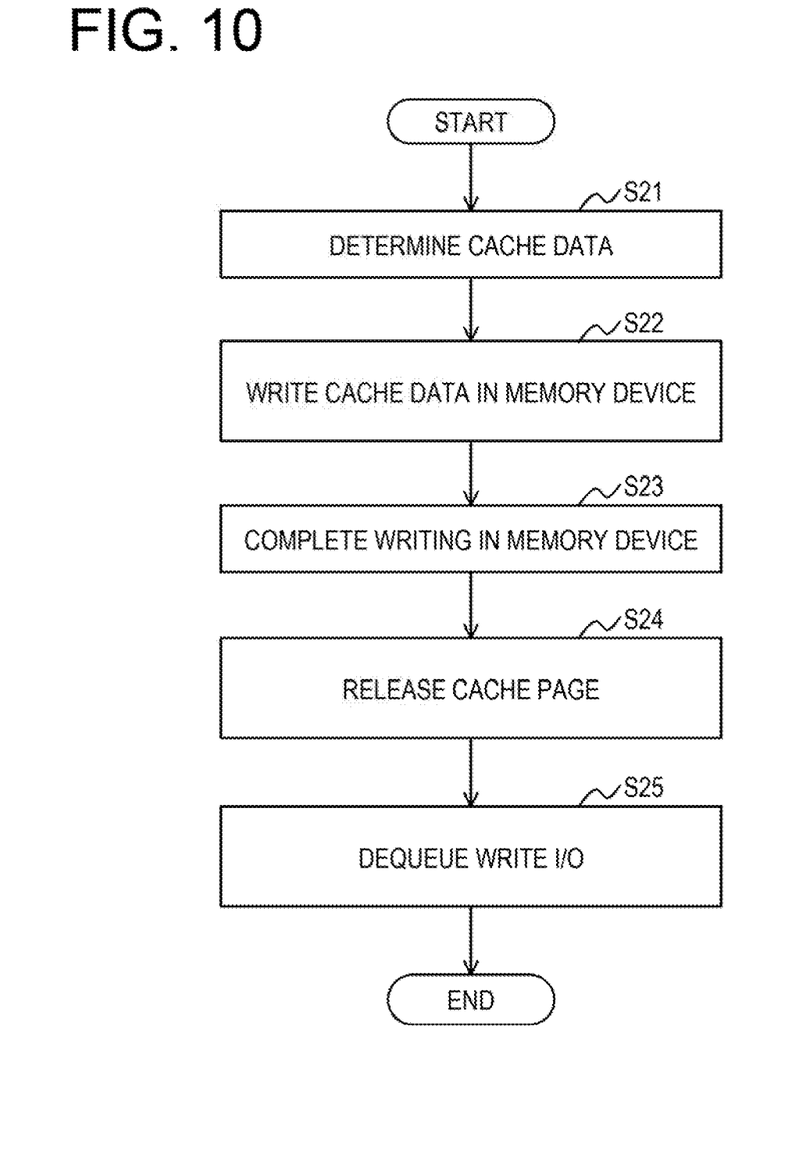
FIG. 10 is a flowchart illustrating an exemplary operation of a destage process performed by a CM.

Next, exemplary operations performed by the storage system 1 according to the embodiment when receiving a Write I/O will be described with reference to FIGS. 9 and 10.

An exemplary operation of a Write I/O reception process performed by the CM 3 will be described first with reference to FIG. 9.

The cache controller 33 waits to receive a Write I/O from the host device 5 ("No" in S1). When it is determined that a Write I/O is received ("Yes" in S1), the information management unit 331 acquires I/O control information 324 (S2). The I/O control information 324 may be acquired only the first time.

The cache controller 33 determines cache hit/miss for the Write I/O (S3). When it is determined that a cache hit occurs ("Yes" in S4), the operation mode determination unit 332 refers to the cache control information 322 corresponding to the hit cache page to determine whether or not the operation mode is the WB mode (S5).

When it is determined that the operation mode is the WB mode ("Yes" in S5), the operation mode determination unit 332 determines that the operation is to be performed in the WB mode. Then, the access unit 333 performs the Write I/O in the WB mode (S6) and the process proceeds to S1.

When it is determined that the operation mode is not the WB mode ("No" in S5), the operation mode determination unit 332 determines whether or not there are any pieces of cache control information 322 (CBE) operating in the WB mode in the access range designated in the Write I/O (S7).

When it is determined that there are some pieces of cache control information 322 operating in the WB mode in the access range ("Yes" in S7), the process proceeds to S6 where the access unit 333 performs the write I/O in the WB mode.

When it is determined that there is no piece of cache control information 322 operating in the WB mode in the access range ("No" in S7), the operation mode determination unit 332 determines that the operation is to be performed in the WT mode. Then, the access unit 333 performs the write I/O in the WT mode (S8) and the process returns to S1.

When it is determined that a cache miss occurs ("No" in S4), the operation mode determination unit 332 refers to the free-cache-page management information 321 or the queue 323 to determine whether or not there are any pieces of waiting requisition for cache acquisition (S9). When it is determined that there is no piece of waiting requisition for cache acquisition ("No" in S9), the process proceeds to S7.

When it is determined that there are some pieces of waiting requisition for cache acquisition ("Yes" in S9), the operation mode determination unit 332 determines whether or not the number of pieces of waiting requisition for cache acquisition is equal to or larger than a predefined number, based on the number of pieces of I/O control information 324 linked to the queue 323 (S10).

When it is determined that the number of pieces of waiting requisition for cache acquisition is smaller than the predefined number ("No" in S10), the operation mode determination unit 332 sets the operation mode of the I/O control information 324 acquired in S2 with the WT mode and registers the I/O control information 324 in the queue 323 (S11).

Then, the cache controller 33 activates the destage process (S12) and cooperates with the device controller 34 to perform the destage process (S13). When the destage process is completed, the process returns to S1.

When it is determined that the number of pieces of waiting requisition for cache acquisition is equal to or larger than the predefined number ("Yes" in S10), the operation mode determination unit 332 sets the operation mode of the I/O control information 324 acquired in S2 with the WB mode and registers the I/O control information 324 in the queue 323 (514). Then, the process proceeds to S12.

Next, an exemplary operation of the destage process performed by the CM 3 will be described with reference to FIG. 10. The destage process (destage) may be performed asynchronously with the reception of the I/O (e.g., at a predetermined cycle) or may be performed when activated in S12 of FIG. 9.

The cache controller 33 determines cache data to be destaged (S21). The cache data to be destaged may be determined by a known method such as a cache replacement algorithm.

The device controller 34 reads the cache data determined by the cache controller 33 from the cache memory 31 and writes the read cache data in the memory device 40 (S22).

Upon completing the writing of the read cache data in the memory device 40 (S23), the cache controller 33 releases the cache page corresponding to the read cache data which has been written in the cache memory 31 (S24).

Then, the cache controller 33 dequeues a Write I/O waiting for cache acquisition (S25) and the destage process is ended. When the Write I/O is dequeued, the access unit 333 may refer to the I/O control information 324 of the Write I/O to determine (identify) the operation mode to perform the Write I/O in the determined operation mode.

The above-described embodiment may be modified or altered as follows.

For example, in the CM 3, the functions of the cache controller 33 and the device controller 34 may be merged together or each of the functions may be divided into smaller units. In the cache controller 33, the functions of the information management unit 331, the operation mode determination unit 332, and the access unit 333 may be merged in arbitrary combinations or each of the functions may be divided into smaller units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device, comprising:
a memory; and
a processor coupled to the memory and the processor configured to:
receive from a host device a write request for writing data into a memory device;
try to write the data into a cache memory;
select an operation mode of a write process for the write request from among a first mode and a second mode on a basis of whether a cache hit or a cache miss occurs at the trial, the write process being a process of writing the data into the memory device via the cache memory;
return a response to the host device upon completion of writing the data into the cache memory without waiting for completion of the write process when the write process is performed in the first mode;
return a response to the host device upon completion of the write process when the write process is performed in the second mode;
cause the write request to wait for cache acquisition when a cache miss occurs;
set information indicating the selected operation mode into control information related to the write request; and
register the control information in a queue when the write request is caused to wait for cache acquisition.

2. The storage control device according to claim 1, wherein the processor is configured to:

select the first mode when a cache hit occurs.

3. The storage control device according to claim 1, wherein the processor is configured to:

select the second mode when a cache miss occurs and when there is no write request waiting for cache acquisition.

4. The storage control device according to claim 1, wherein the processor is configured to:

select the second mode when a cache miss occurs and when a number of write requests waiting for cache acquisition is smaller than a predetermined number.

5. The storage control device according to claim 1, wherein the processor is configured to:

select the first mode when a cache miss occurs and when a number of write requests waiting for cache acquisition is equal to or larger than a predetermined number.

6. The storage control device according to claim 1, wherein the processor is configured to:

write a piece of data stored in the cache memory into the memory device to secure a free area in the cache memory;

extract a piece of control information from the queue; and perform a write process for a write request corresponding to the extracted piece of control information in an operation mode set in the extracted piece of control information.

7. A non-transitory computer-readable recording medium having stored therein a program that causes a computer to execute a process, the process comprising:

receiving from a host device a write request for writing data into a memory device;

trying to write the data into a cache memory;

selecting an operation mode of a write process for the write request from among a first mode and a second mode on a basis of whether a cache hit or a cache miss occurs at the trial, the write process being a process of writing the data into the memory device via the cache memory;

returning a response to the host device upon completion of writing the data into the cache memory without waiting for completion of the write process when the write process is performed in the first mode;

returning a response to the host device upon completion of the write process when the write process is performed in the second mode;

causing the write request to wait for cache acquisition when a cache miss occurs;

setting information indicating the selected operation mode into control information related to the write request; and registering the control information in a queue when the write request is caused to wait for cache acquisition.

8. The non-transitory computer-readable recording medium according to claim 7, the process further comprising:

selecting the first mode when a cache hit occurs.

9. The non-transitory computer-readable recording medium according to claim 7, the process further comprising:

selecting the second mode when a cache miss occurs and when there is no write request waiting for cache acquisition.

10. The non-transitory computer-readable recording medium according to claim 7, the process further comprising:

selecting the second mode when a cache miss occurs and when a number of write requests waiting for cache acquisition is smaller than a predetermined number.

11. The non-transitory computer-readable recording medium according to claim 7, the process further comprising:

selecting the first mode when a cache miss occurs and when a number of write requests waiting for cache acquisition is equal to or larger than a predetermined number.

12. The non-transitory computer-readable recording medium according to claim 7, the process further comprising:

writing a piece of data stored in the cache memory into the memory device to secure a free area in the cache memory;

extracting a piece of control information from the queue; and performing a write process for a write request corresponding to the extracted piece of control information in an operation mode set in the extracted piece of control information.

* * * * *